(12) United States Patent
Hasegawa

(10) Patent No.: US 6,937,565 B2
(45) Date of Patent: Aug. 30, 2005

(54) SHAPING CONTROL METHOD AND SHAPING CONTROL APPARATUS

(75) Inventor: Jun Hasegawa, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 636 days.

(21) Appl. No.: 09/780,495

(22) Filed: Feb. 12, 2001

(65) Prior Publication Data

US 2001/0014099 A1 Aug. 16, 2001

(30) Foreign Application Priority Data

Feb. 10, 2000 (JP) .................................... 2000-033288

(51) Int. Cl.[7] .............................................. H04L 12/56
(52) U.S. Cl. ................. 370/230.1; 370/388; 370/395.2
(58) Field of Search ......................... 370/230, 230.1, 370/232, 233, 386, 388, 412–416, 231, 235, 252, 253, 389, 395.1, 395.2, 428, 429

(56) References Cited

U.S. PATENT DOCUMENTS

| | | | |
|---|---|---|---|
| 6,185,188 B1 | | 2/2001 | Hasegawa |
| 6,532,213 B1 | * | 3/2003 | Chiussi et al. ........... 370/230.1 |
| 2003/0007455 A1 | * | 1/2003 | Kohzuki et al. ......... 370/230.1 |

FOREIGN PATENT DOCUMENTS

| | | |
|---|---|---|
| JP | 9-307566 | 11/1997 |
| JP | 10-173677 | 6/1998 |

OTHER PUBLICATIONS

Jun Hasegawa, et al., "An Implementation of Scheduler in ATM Switch", Technical Report of IEICE, SSE99–33, RCS99–57, Jul. 1999, pp. 19–24 (with English abstract).

* cited by examiner

Primary Examiner—Alpus H. Hsu
(74) Attorney, Agent, or Firm—Oblon, Spivak, McClelland, Maier & Neustadt, P.C.

(57) ABSTRACT

A shaping control method and apparatus performing a shaping for a large amount of connections with high accuracy, the apparatus including a theoretical transfer time calculator, a theoretical transfer time holding section, first and second time managing sections, a theoretical transfer time acquisition section, and a transfer determining section. The second time managing section holds information relating to connections in waiting transfer, by dividing into standardized time slots. A portion of connection information stored in the second time managing section is stored in the first time managing section. The information relating to connections in waiting is stored in the first time managing section or the second time managing section. Thereby, a shaping in stages for the same shaping subject and a shaping of a large amount of connections with high accuracy can be performed. Also, an optimum shaping for a plurality of shaping subjects different from each other can be realized.

19 Claims, 8 Drawing Sheets

FIG. 3

| DIVISION NUMBER | | 1 | 2 | 3 | 4 | ... | n-2 | n-1 | n |
|---|---|---|---|---|---|---|---|---|---|
| TIME SERIES | TG1 | TD11 | TD12 | TD13 | TD14 | ... | | TD1n-2 | TD1n-1 | TD1n |
| TIME SERIES | TG2 | TD21 | TD22 | TD23 | TD24 | ... | | TD2n-2 | TD2n-1 | TD2n |
| TIME SERIES | TG3 | TD31 | TD32 | TD33 | TD34 | ... | | TD3n-2 | TD3n-1 | TD3n |

SECOND TIME MANAGING SECTION

3

FIRST TIME MANAGING SECTION

| TRANSFER-ABLE IDENTIFIER 1 | THEORETICAL TRANSFER TIME 1 | CONNECTION IDENTIFIER 1 |
|---|---|---|
| TRANSFER-ABLE IDENTIFIER 2 | THEORETICAL TRANSFER TIME 1 | CONNECTION IDENTIFIER 1 |
| ⋮ | ⋮ | ⋮ |
| TRANSFER-ABLE IDENTIFIER 3 | THEORETICAL TRANSFER TIME 3 | CONNECTION IDENTIFIER 3 |
| TRANSFER-ABLE IDENTIFIER 4 | THEORETICAL TRANSFER TIME 4 | CONNECTION IDENTIFIER 4 |

F I G. 4

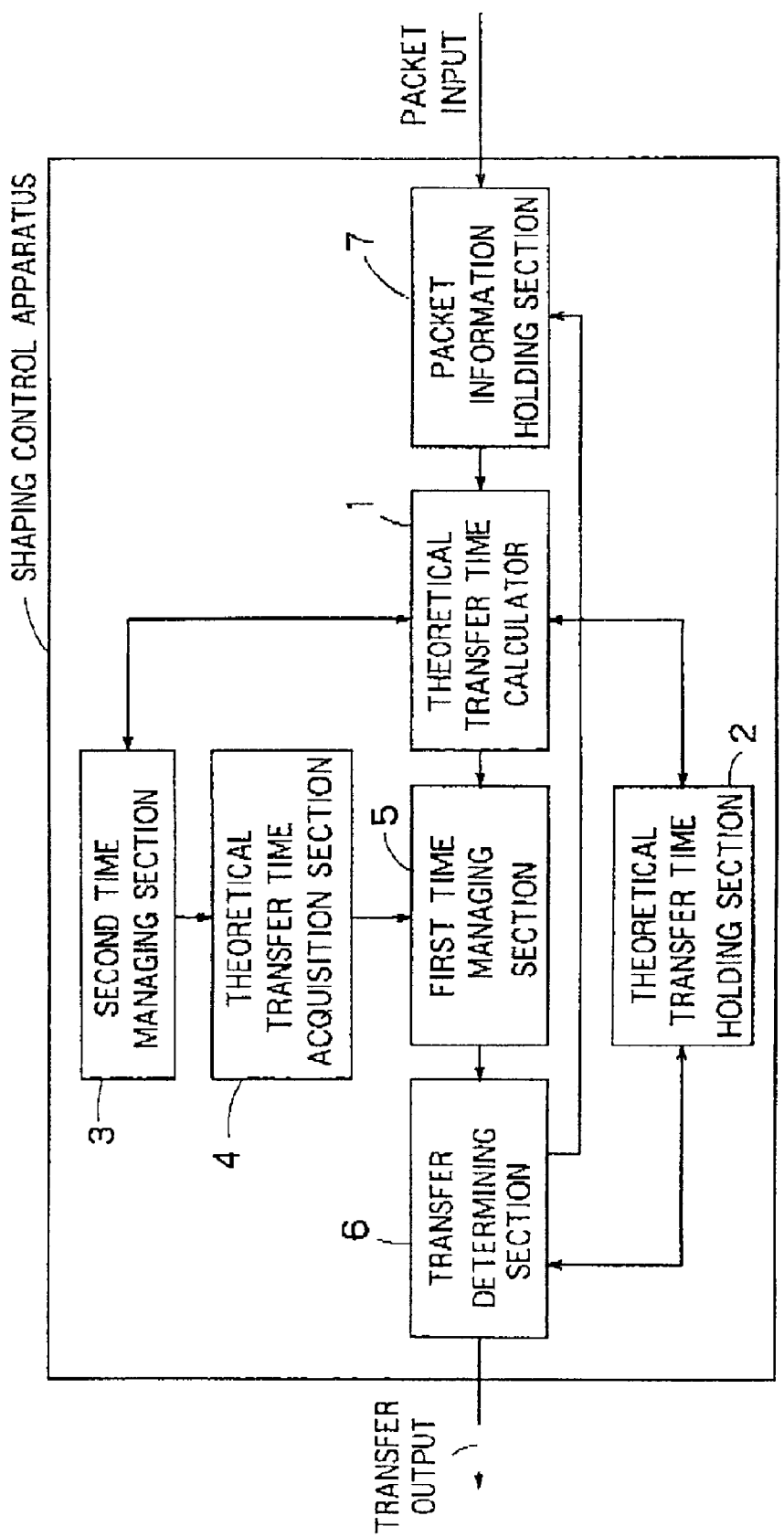
F I G. 7

SHAPING CONTROL METHOD AND SHAPING CONTROL APPARATUS

CROSS REFERENCE TO RELATED APPLICATIONS

The subject application is related to subject matter disclosed in Japanese Patent Application No. 2000-33288 filed on Feb. 10, 2000 in Japan to which the subject application claims priority under Paris Convention and which is incorporated herein by reference.

BACKGROUND OF THE INVENTION

1. Field of the Invention

The present invention relates to a shaping control method and a shaping control apparatus for controlling a transfer rate of packets so that the transfer rate does not overrun a predetermined reference rate.

2. Related Background Art

In packet communication, control called as a shaping for maintaining the transfer rate within the reference rate that vendors set is performed to improve use efficiency of lines, so that the transfer rate does not overrun a predetermined limit.

As conventional techniques, there is provided with a method for determining in advance a time slot to transfer the packets and managing by e.g. a list, which is called as a time slot ahead determining method, and a method for scanning information of all elements before the transfer time of the packets and determining whether or not to be able to transfer them by each scan, which is called as a method of scanning at transfer time.

The time slot ahead determining method calculates a transfer-able time of the connections that the packets belong, and inserts the packets into the list in which the packets are arranged in transfer order. In case of this method, the arriving order of the packet is generally different from the transfer order of the packet. Because of this, if necessary, a processing which scans the already lined-up elements and sorts them in transfer-able time order is required. Accordingly, in order to correctly set the transfer order, it is necessary to scan all the elements and compare a theoretical transfer time of each element with each other.

However, because there is a limit for the number of times of access for hold means memorizing the elements, the number of the elements which can scan in transfer cycle of the packets is limited. Accordingly, it is difficult to perform the shaping for large amount of connections with a high degree of accuracy.

On the other hand, because the method of scanning at transfer time scans the elements transfer-able from all the elements, it is possible to take e.g. conditions of a physical layer that the connections are connected into account. However, the condition of the physical layer changes by each packet, and a time when the packets of the connections with high speed rate are held in the hold means is short. Because of this, it is necessary to scan all the elements at each packet cycle in order to perform the high-precision shaping. However, as described above, because there is a limit to the number of times of access for the hold means, it is difficult to perform the shaping for large amount of connections with a high degree of accuracy.

SUMMARY OF THE INVENTION

An object of the present invention is to provide a shaping control method and a shaping control apparatus capable of performing a shaping for large amount of connections with a large degree of accuracy.

In order to achieve the foregoing object, a shaping control method of performing shaping control so that transfer speed of packets is within a reference speed predetermined in advance, wherein said shaping control method sets accuracy of transfer time of connections that the packets belongs, in accordance with time interval up to an actual transfer time of the connections in stages, by each of shaping subjects.

According to the present invention, because transfer order of connections that packets belong is set by each of shaping subjects in stages, it is possible to perform shaping large amount of connections with a large degree of accuracy.

Furthermore, the present invention has first hold means for holding information relating to theoretical transfer time by dividing at time unit different by each of categories of connections such as types of output ports, types of line qualities and types of communication speeds. Because of this, it is possible to set transfer order optimum by each category of the connections.

Furthermore, a shaping control apparatus of performing shaping control so that transfer speed of packets is within a reference speed predetermined in advance, comprising:

theoretical transfer time calculating means configured to calculate theoretical transfer time of connections that packets belong;

first holding means configured to hold information relating to the calculated theoretical transfer time by dividing into standardized time slots, while connecting with the connections that the packets belong;

second holding means configured to add information relating to transfer order to a portion of said information held in said first holding means, and hold the added information while connecting with the connections that the packets belong; and extracting means configured to compare the theoretical transfer time corresponding to said information held in said second holding means with a reference time, and extract the information before said reference time, wherein the packets belonging to the connections are transferred based on the information extracted by said extracting means.

Furthermore, a shaping control method of performing shaping control so that transfer speed of packets is within a reference speed predetermined in advance, comprising:

theoretical transfer time calculating means configured to calculate a theoretical transfer time of connections that packets belong;

packet information holding means configured to hold information relating to the packets by each connection, before said theoretical transfer time calculating means calculate the theoretical transfer time of the connection that the packets belong;

first holding means configured to divide the calculated information relating to said theoretical transfer time at standardized time unit, and hold the divided information while connecting with the connection that the packet belongs;

second holding means configured to add a portion of said information held in said first holding means to information relating to transfer order, and hold the added information while connecting with the connection that the packet belongs; and extracting means configured to extract a packet of the same connection as the connection that the packet transferred from said second holding means belongs, from said packet information holding means, and transfer the extracted packet to said theoretical transfer time calculating means.

BRIEF DESCRIPTION OF THE DRAWINGS

FIG. 3 is a diagram showing internal configuration of a second time managing section;

FIG. 4 is a diagram showing internal configuration of a first time managing section;

FIG. 7 is a block diagram of a second embodiment of a shaping control apparatus according to the present invention.

DESCRIPTION OF THE PREFERRED EMBODIMENTS

Figure 1:
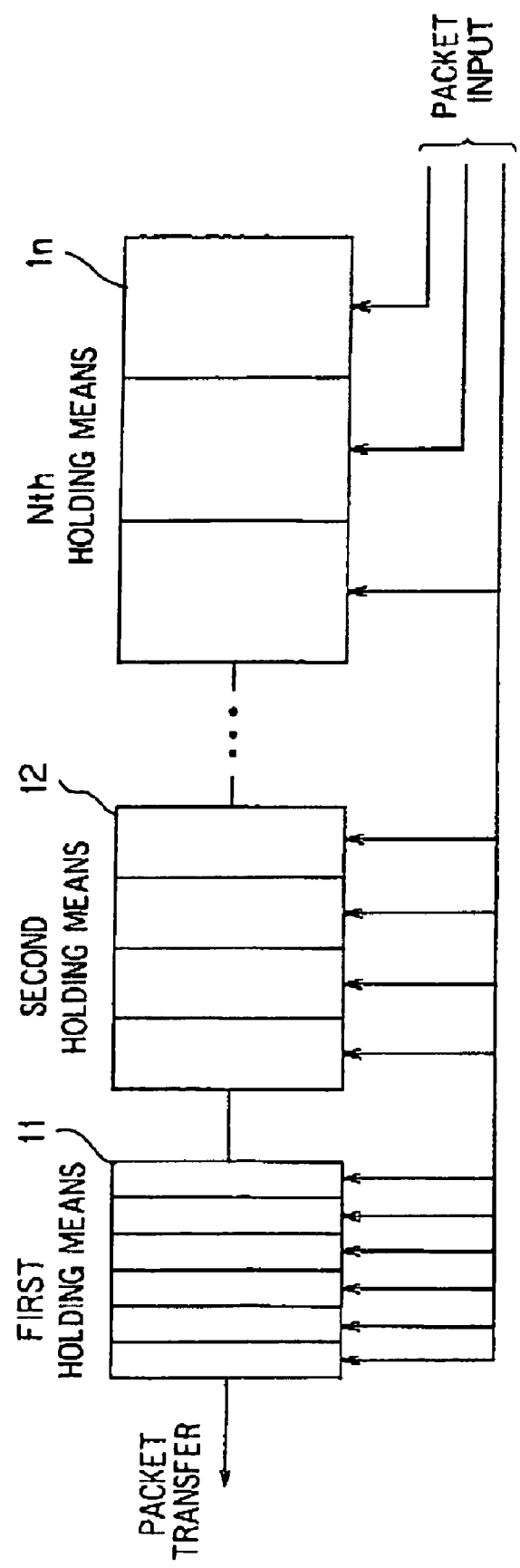
FIG. 1 is a diagram for explaining the basic principle of the present invention.

First of all, a basic principle of the present invention will be explained. FIG. 1 is a diagram for explaining the basic principle of the present invention. The present invention is provided with a plurality of holding means capable of storing packets. Each of the holding means is arranged in order of time series. FIG. 1 shows an example in which the holding means arranged at a location nearest to a transfer time of the packet is called as first holding means 11, the holding means next to the first holding means 11 is called as second holding means 12, and the holding means arranged at a location farthest from the transfer time of the packet is called as nth (n is an integer more than 1) holding means 1n.

The packets are firstly held to the holding means of a high order, and then they are transferred to the holding means of a lower order in turn. Eventually, they are held to first holding means 11, and then transferred to outside in accordance with transfer order. Only one packet of the same connection is held in the holding means of FIG. 1, and after the packet is transferred from the first holding means 11, a next packet of the same connection is held in any of the holding means. On the other hand, a plurality of packets corresponding to a plurality of connections can simultaneously be held in any of the holding means of FIG. 1. That is, when a plurality of packets exist in the holding means of FIG. 1, each of the packets belongs to the connections different from each other. The packets from outside are not necessarily held in the holding means 11 of highest order. The packets may be held in the holding means of lower order, without being held in the holding means of higher order.

Here, a modified example that a plurality of the packets belonging to the same connection exists in the holding means of FIG. 1 is feasible.

The first holding means 11 manage each packet in holding in transfer order. That is, each packet held in the first holding means 11 is managed by the transfer time of each packet. On the other hand, the holding means 12-1n of a high order equal to or more than second order manage each packet by dividing the packets in areas into standardized time unit. Accordingly, a plurality of the packets that the transfer times are different from each other are stored at random in the same divided area.

Among the holding means 12-1n of the high order equal to or more than second order, the holding means of a lower order has a time interval in which the time unit is narrower. Therefore, the holding means of a lower order can manage the transfer time of the packets with a higher degree of accuracy than the holding means of a higher order.

Thus, the present invention has a plurality of the holding means that accuracy of time is different. First of all, the packet is held in the holding means that accuracy of time is coarse, and then the packet is gradually transferred to the holding means of a higher order, and finally the transfer order is set to store in the first holding means 11, and then the packets are transferred to outside in order. Because of this, it is possible to perform the shaping of large amount of the connections with a high degree of accuracy.

A shaping control apparatus according to the present invention will now be concretely described hereinafter with reference to the accompanying drawings.

(First Embodiment)

Figure 2:
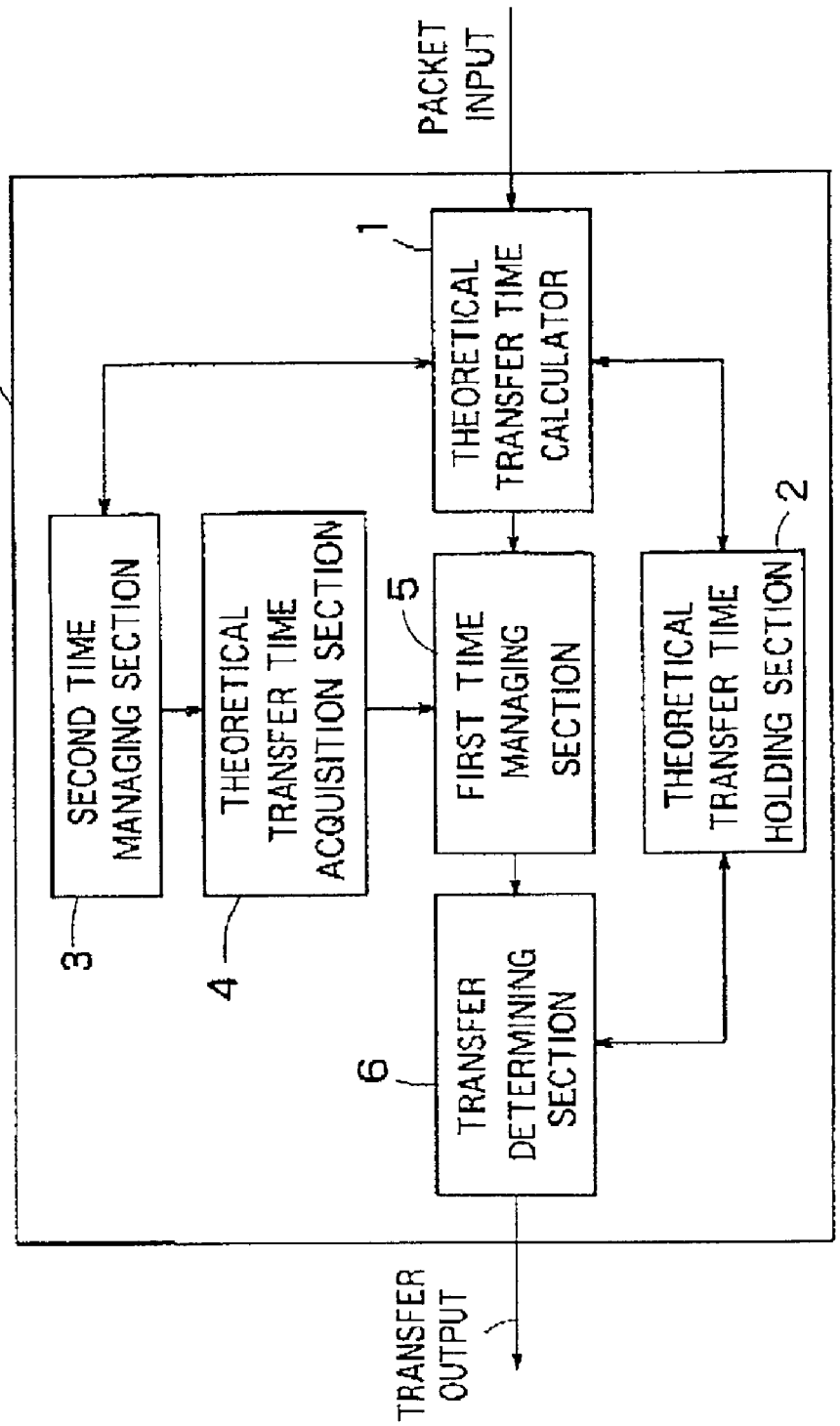
FIG. 2 is a block diagram of a first embodiment of a shaping control apparatus according to the present invention.

FIG. 2 is a block diagram of a first embodiment of a shaping control apparatus according to the present invention. The shaping control apparatus of FIG. 2 has a theoretical transfer time calculator (theoretical transfer time calculating means) 1, a theoretical transfer time holding section 2, a second time managing section (first holding means) 3, a theoretical transfer time acquisition section (identifier setting means) 4, a first time managing section (second holding means) 5, and a transfer determining section (extracting means) 6.

The theoretical transfer time holding section 2 holds a theoretical transfer time such as a peak rate or a sustainable rate by each of shaping subjects such as a virtual path (VP) or a virtual connection (VC), while connecting with the connections that the packets belongs. transfer time holding section 2 based on the calculated result.

The second time managing section 3 holds information relating to the connection waiting the transmission by dividing at a standardized time unit. FIG. 3 is a diagram showing an example of the second time managing section 3, and shows an example of sorting the connections waiting the transmission at a prescribed time slot. Each of regions in FIG. 3 corresponds to the time slot.

FIG. 3 shows an example that time series TG1–TG3 have time slots different from each other. The time series TG1 have the time slots TD11–TD1n, the time series TG2 have the time slots TD21–TD2n, and the time series TG3 have the time slots TD31–TD3n.

The time series TG1–TG3 of FIG. 3 show an example sorted in accordance with the transfer speed, and unit time of the time slot at high speed side, which shows the time interval allotted to a single time slot, is shorter than unit time of the time slot at low speed side. For example, unit time of the time series TG1 of FIG. 3 is 16 packet cycles, unit time of the time series TG2 is 64 packet cycles, and unit time of the time series TG3 is 256 packet cycles.

There is provided with a time series indicator for discriminating between a head time slot and a last time slot by each time series. Here, the head time slot shown by the time series indicator, which is shown at left end in FIG. 3, is the time slot nearest to current time, and the last time slot, which is shown at right end in FIG. 3, is the time slot farthest from current time.

In the time series TG1 of FIG. 3, the time series proceed from past to future in order of the time slots TD11–TD1$n$. In the time slot TD11, gathering of the theoretical transfer time of the connection transferred to the head time slot of the time series TG1 is accommodated. In the time slot TD1$n$, gathering of the theoretical transfer time of the connection transferred to the last time slot of the time series TG1 is accommodated.

Similarly, in the time series TG2, the time series proceed from past to future in order of the time slots TD21–TD2$n$. In the time slot TG3, the time series proceed from past to future in order of the time slots TD31–TD3$n$.

A time slot indicator for managing a head location, a last location, and a length of elements in the time slots is provided at each of the time slots in FIG. 3. Here, direction from the head location to the last location of the time slot indicator expresses connection order of the elements in the time slot, and is not necessarily connected with traveling direction of time.

The time series TG1–TG3 of FIG. 3 are set based on categories of the connections such as types of output ports, types of line qualities, and types of communication speeds. Each of the time series has a standardized time different from each other. The length of these standardized time is set based on the categories of the connections.

For example, as shown in FIG. 4, the first managing section 5 of FIG. 2 has a management table to associate a connection identifier connected with the connections that the packet belongs, with a theoretical transfer time and a transfer-able identifier for expressing conformity to transfer time. The first time managing section 5 stores a portion of connection information stored in the second time managing section 3 by move or copy operation.

At this time, it is desirable to transfer the connection information stored in the second time managing section 3 to the first time managing section 5 by a LIFO (Last In First Out) method. By employment of the LIFO method, it is possible to shorten time required to search of the transferred information and read-out of the information. That is, because data stored in the second time managing section 3 behind time is generally high-speed data, it is necessary to transfer the high-speed data as soon as possible. Accordingly, the LIFO method is more desirable than FIFO method.

The transfer determining section 6 of FIG. 2 compares the theoretical transfer time held in the first time managing section 5 with current time by each of packet cycles, and sets a transfer-able identifier of the connection corresponding to the theoretical transfer time showing current time or past of current time.

The transfer determining section 6 selects the connection to be transferred among the connection information relating to the connection that the transfer-able identifier is set, taking e.g. priority into account, and then outputs the connection information via a signal line. The transfer determining section 6 calculates again the theoretical transfer time of the connection held in the theoretical transfer time holding section 2, and updates the theoretical transfer time if necessary.

Figure 5:
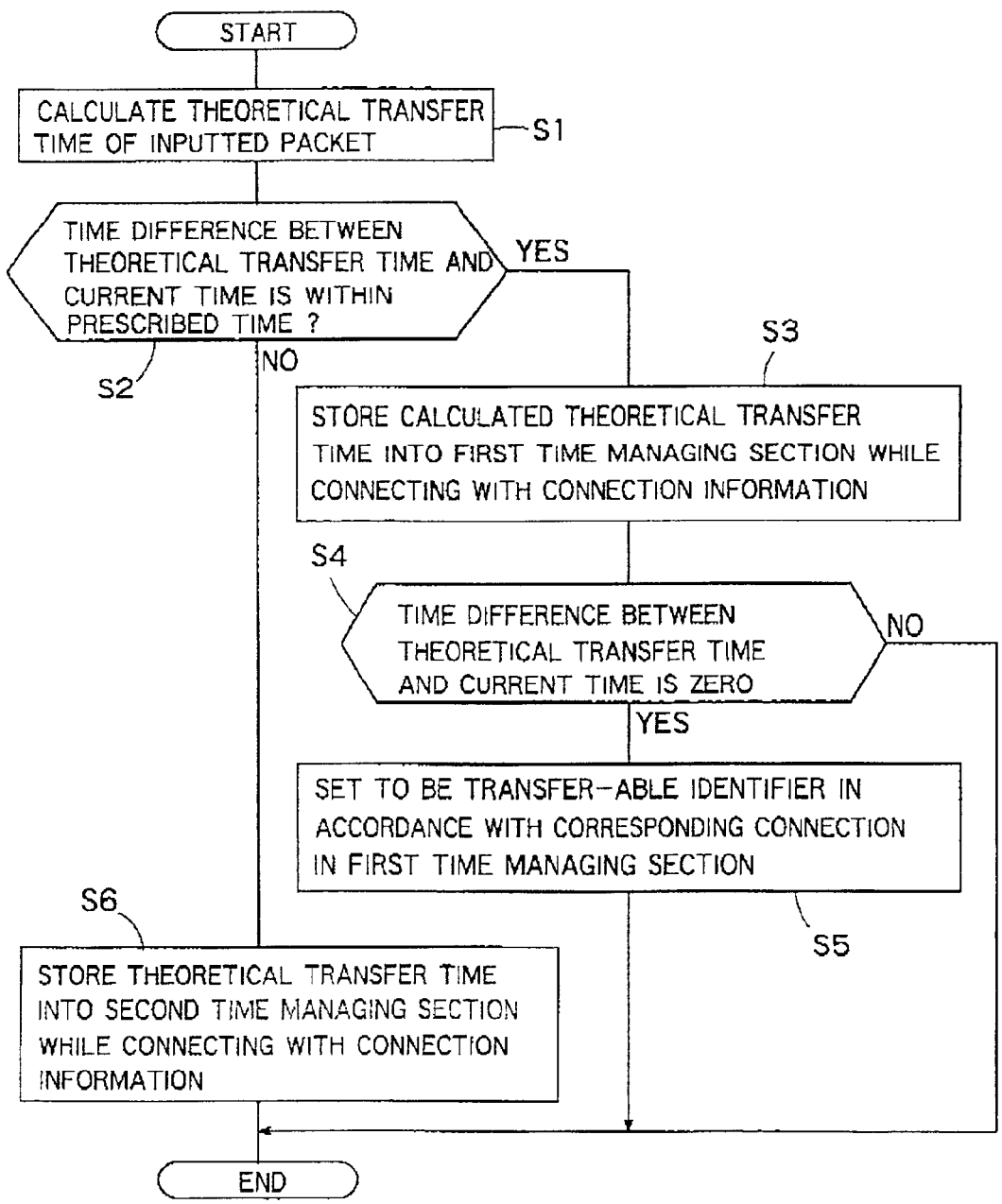
FIG. 5 is a flowchart showing processing operation of a theoretical transfer time calculating section.

FIG. 5 is a flowchart showing processing operation of the theoretical transfer time calculating section 1. First of all, the theoretical transfer time is calculated based on the time held in the theoretical transfer time holding section 2 for the packets inputted via the signal line (step S1).

Here, the theoretical transferring time of each packet such as a peak rate and a sustainable rate of the shaping is calculated. The shaping subjects are, for example, types of the output ports, types of line qualities, types of communication speeds, and types of the virtual paths.

Next, in step S2, whether or not time difference between the calculated transfer time and current time is within a prescribed time, for example, within unit time of each time slot is determined. When the time difference is within a prescribed time, the theoretical transfer time calculator 1 stores the calculated theoretical transfer time to the first time managing section 5, while connecting the calculated theoretical transfer time with the connection information, as shown in step S3.

Next, whether or not the above-mentioned time difference is zero is determined, as shown in step S4. When the time difference is zero, that is, the theoretical transfer time coincides with current time, the transfer-able identifier in accordance with the corresponding connection in the first time managing section 5 is set to be the transfer-able identifier, as shown in FIG. 5.

Figure 6:
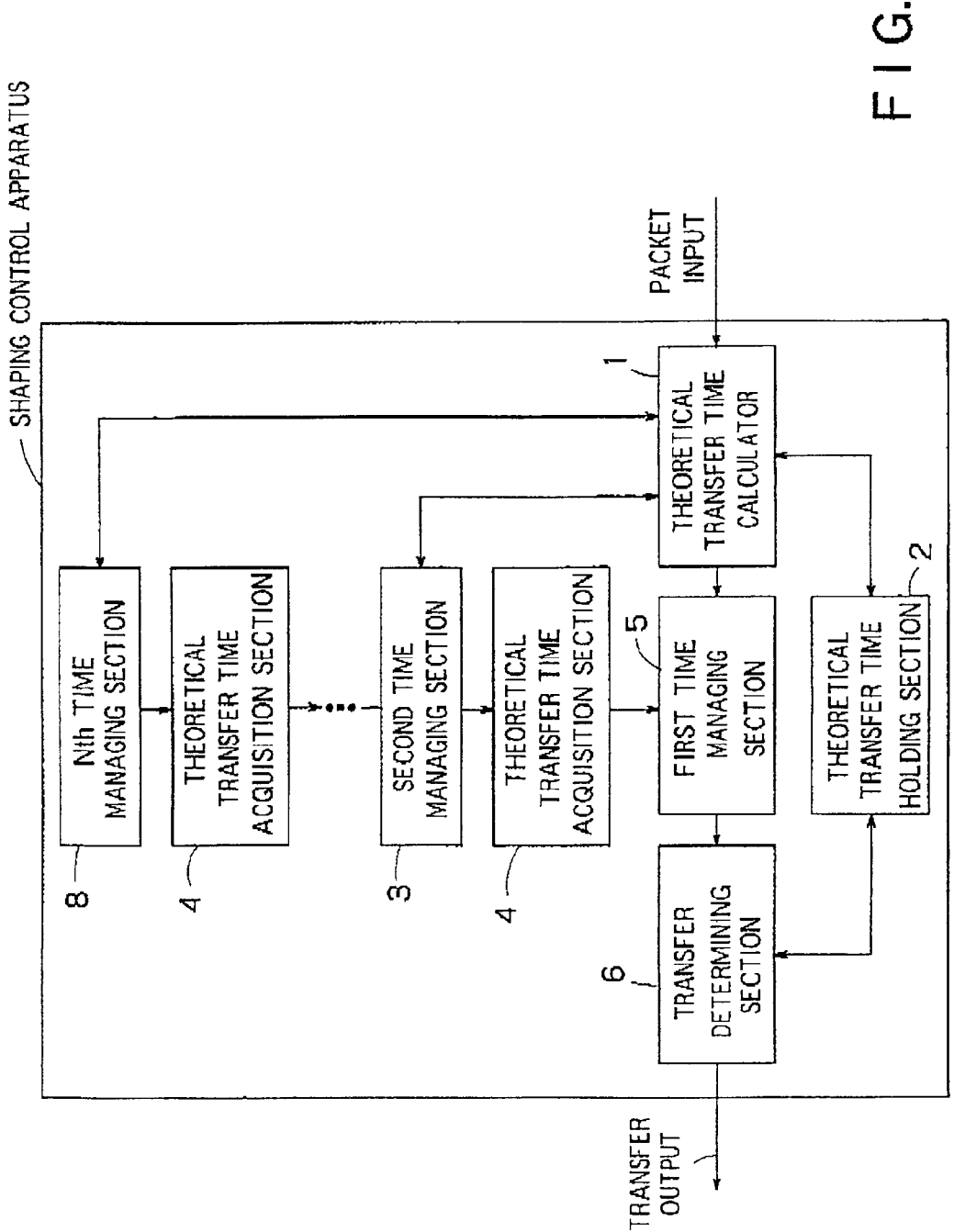
FIG. 6 is a block diagram showing a modified example of a first embodiment having more than two types of time managing sections.

On the other hand, when the above-mentioned time difference is more than the prescribed time, the corresponding time slot is calculated from the theoretical transfer time, and the theoretical transfer time is held in a queue of the corresponding time slot of the second time managing section 3 based on the information of the time slot identifier, while connecting with the connection information, as shown in FIG. 6.

At this time, when the calculated theoretical transfer time is nearer in future than time zone of the last time slot provided in order of the time series, the theoretical transfer time is held in the last time slot that the same time series indicator shows, while connecting with the connection information. Arrangement in the time slot is not necessarily the time order of the theoretical transfer time.

The theoretical transfer time acquisition section 4 of FIG. 2 selects the time series in the second time managing section 3 by methods such as priority, and picks up a plurality of the connection information of the theoretical transfer time from the time slot that gathering transferred at head of the time series is held. The picked-up connection information is held in the first time managing section 5, while connecting with the connection information.

For example, when the time series TG1 is selected, among the queue of the head time slot that the time series indicator of the time series shows, a plurality of elements of the head time slot that the time slot indicator of the time slot shows are extracted. The theoretical transfer time acquisition section 4 can select the connection information among a plurality of time slots.

At this time, when each of the theoretical transfer time held in the first time managing section 5 coincides with current time or is past of current time, the transfer-able identifier is set while connecting with the theoretical transfer time held in the first time managing section 5.

Thus, the present embodiment sorts and stores the connection information in the second time managing section 3 by each of the shaping subjects, and then change the order of the connection information in order of transmission. When the transmission is ready, the connection information is transferred in the first time managing section 5. Because of this, it is possible to perform the shaping of large amount of connections with a high degree of accuracy.

Furthermore, it is possible to perform optimum shaping for a plurality of shaping subjects different from each other.

Whether or not to transfer the connection information held in the first time managing section 5 is discriminated by the transfer-able identifier. Because of this, it is possible to quickly determine whether or not to transfer the connection information.

Because timing for transferring the connection information from the second time managing section 3 to the first time managing section 5 is set based on the result of comparing the calculated theoretical transfer time with the reference time, it is possible to arbitrarily change contents of the first time managing section 5.

Incidentally, FIG. 2 shows an example of having two types of the time managing sections 3 and 5. As shown in FIG. 6, more than two types of the time managing sections may be provided. In case of FIG. 6, the theoretical transfer time acquisition section 4 is provided in accordance with each of the time managing sections 3 and 8. Each of more than two types of the time managing sections 3 and 8 holds the packets in the areas divided at the standardized time slot, respectively. The time managing section of higher order has the time interval longer in one area. If the number of the time managing section is increased, it is possible to perform the shaping of larger amount of the connections with a high degree of accuracy.

(Second Embodiment)

FIG. 7 is a block diagram of a shaping control apparatus according to the present invention. In FIG. 7, the same number is attached for constituents common to FIG. 2. Hereinafter, points different from the first embodiment will be mainly described.

The shaping control apparatus of FIG. 7 is constituted of adding a packet information holding section 7 for constituents of FIG. 2. The packet information holding section 7 holds information relating to the inputted packets by each connection, before performing the calculating operation in the theoretical transfer time calculating section 1.

When the first time managing section 5 and the second time managing section 3 do not hold the information relating to the connection, the transfer determining section 6 of FIG. 7 sends the information relating to the connection in the theoretical transfer time calculator 1. On the other hand, when the first time managing section 5 and the second time managing section 3 holds the information relating to the connection, the transfer determining section 6 waits as it is.

When the packet is transferred outside, the transfer determining section 6 extracts the information relating to the same connection as the connection that the packet belongs, from the packet information holding section 7. The same processing as that of FIG. 5 is carried out for the packets sent to the theoretical transfer time calculator 1.

Thus, the transfer determining section 6 of FIG. 7 controls so that the packet belonging to the same connection or the information connected with the connection exists only one.

Because of this, the packets does not back up in the first time managing section 3 and the second time managing section 5, thereby accurately calculating the transfer time of the packets. Accordingly, it is possible to minimize period after calculating the theoretical transfer time up to be actually transferred, thereby improving accuracy of the transfer time.

Figure 8:
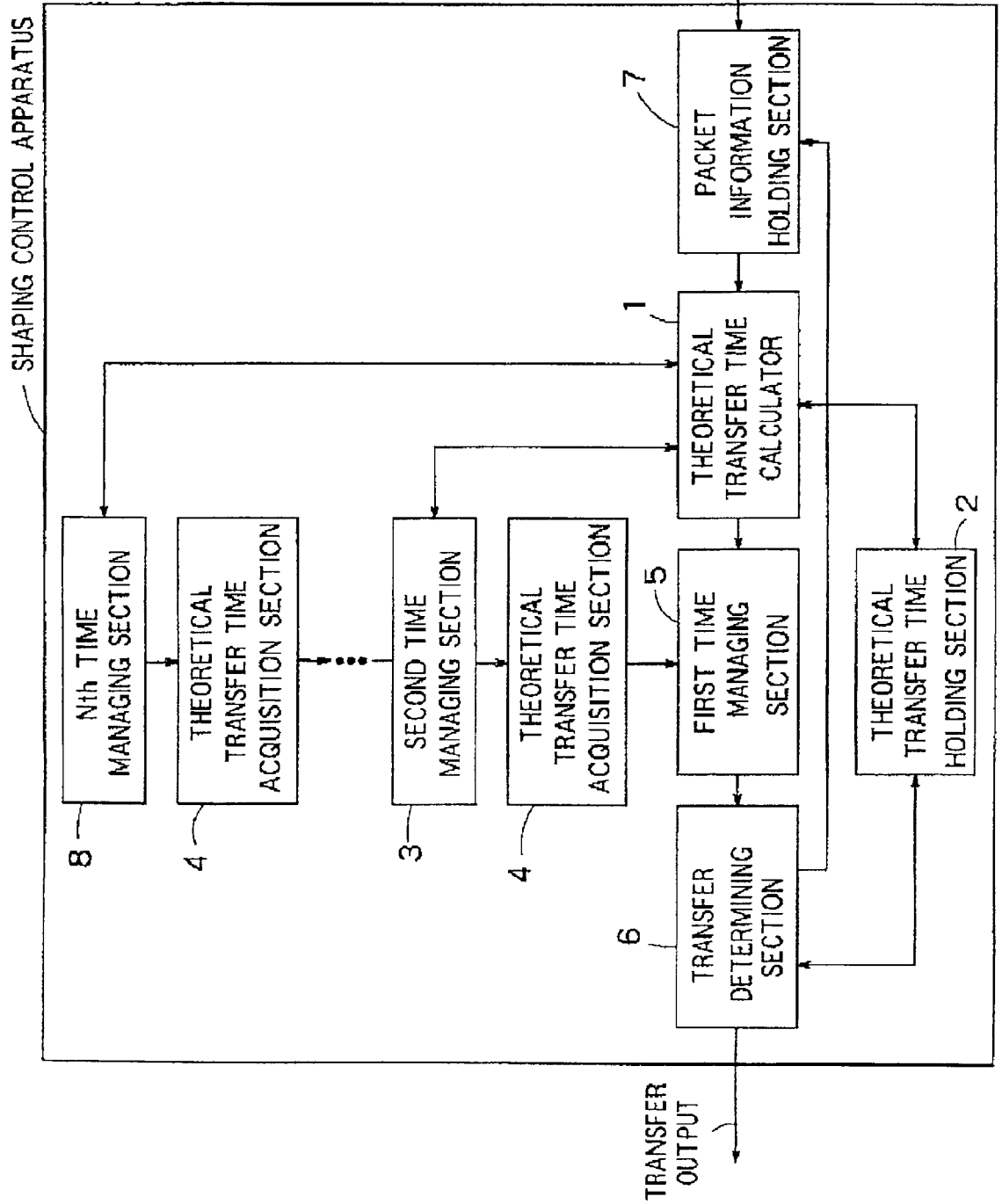
FIG. 8 is a block diagram showing a modified example of a second embodiment having more than two types of time managing sections.

In the second embodiment, the time managing section 8 of more than second order may be provided. The block diagram in this case is shown in FIG. 8. Each of more than one types of the time managing sections 3 and 8 is provided with the theoretical transfer time acquisition section 4a.

If time context between the time series and the time slot in at least one of the first time managing section 5 and the second managing section 3 is managed by list structure, it is possible to simplify internal configuration. Otherwise, at least one of the first time managing section 5 and the second time managing section 3 may be constituted of a content-addressable memory.

What is claimed is:

1. A shaping control method performing shaping control so that transfer speed of packets is within a reference speed predetermined in advance, the method comprising:

setting accuracy of a transfer time of connections for which the packets belong, in accordance with a time interval up to an actual transfer time of the connections in stages, by each of shaping subjects; and wherein the accuracy of the transfer time of the connections is set higher in stages at a time nearer to an actual transfer time of the connections.

2. A shaping control method performing shaping control so that transfer speed of packets is within a reference speed predetermined in advance, the method comprising:

setting accuracy of a transfer time of connections for which the packets belong, in accordance with a time interval up to an actual transfer time of the connections in stages, by each of shaping subjects; and wherein the accuracy of the transfer time of the connections is set in n (n is an integer equal to or more than 2) stages;

wherein the packets of each connection are distributed to any among said n stages in accordance with the time interval up to an actual transfer time of the connections; and wherein in the stage that time accuracy is highest, the packets are managed in a transfer order, and in the other stages, the packets are managed by being divided into standardized time slots.

3. The shaping control method according to claim 2, wherein the time interval of a time slot in a stage of mth order (m is an integer equal to or more than 2) with reference to the actual transfer time of the connections is set shorter than that in a stage of (m+1)th order.

4. A shaping control apparatus performing shaping control so that a transfer speed of packets is within a reference speed predetermined in advance, comprising:

theoretical transfer time calculating means configured to calculate theoretical transfer time of connections for which the packets belong;

first holding means configured to hold information relating to the calculated theoretical transfer time by dividing said information into standardized time slots, while connecting with the connections for which the packets belong;

second holding means configured to add information relating to a transfer order to a portion of said information held in said first holding means, and to hold the added information by linking with the connections for which the packets belong; and extracting means configured to compare the theoretical transfer time corresponding to said information held in said second holding means with a reference time, and to extract the information before said reference time, wherein the packets belonging to the connections are transferred based on the information extracted by said extracting means.

5. The shaping control apparatus according to claim 4,
wherein said theoretical transfer time calculating means calculates again the theoretical transfer time of the connection based on the transfer time of the connection for which the packets extracted by said extracting means belong.

6. The shaping control apparatus according to claim 4,
wherein said first holding means sets a plurality of time series different from each other based on categories of the connections including at least one of types of output ports, types of line qualities, and types of communication speeds, and divides into these time series the connections for which the packets belong.

7. The shaping control apparatus according to claim 6,
wherein said extracting means assigns priorities based on the categories of the connections, and allows a portion of said information held in said first holding means to hold in said second holding means based on the assigned priorities.

8. The shaping control apparatus according to claim 7,
wherein said extracting means assigns priorities based on categories of said connections, and allows a portion of said information held in said first holding means to hold in said second holding means based on the assigned priorities.

9. The shaping control apparatus according to claim 4,
wherein said first holding means sets a plurality of time series having standardized times different from each other, and divides into these time series the connections for which the packets belong.

10. The shaping control apparatus according to claim 9,
wherein said first holding means sets standardized times corresponding to a plurality of said time series, respectively, based on categories of the connections including at least one of types of output ports, types of line qualities, and types of communication speeds.

11. The shaping control apparatus according to claim 4,
wherein said second holding means allows a portion of said information held in said first holding means to hold in said second holding means, when a time difference between the theoretical transfer time calculated by said theoretical transfer time calculating means and said reference time is within a prescribed time.

12. The shaping control apparatus according to claim 4,
wherein said second holding means holds a transferable identifier showing whether or not to transfer the connections for which the packets belong by linking with the connections, said identifier being connected,
further comprising identifier setting means configured to set said transferable identifier corresponding to the connections for which the packets having said theoretical transfer time before said reference time belong, to be transferable,
wherein said extracting means extracts information relating to the connections for which said transfer-able identifier is set to be transfer-able, among the connections held in said second holding means.

13. The shaping control apparatus according to claim 4,
wherein said extracting means manages said information held in said first holding means by a LIFO (Last In Fast Out) method.

14. A shaping control apparatus performing shaping control so that a transfer speed of packets is within a reference speed predetermined in advance, comprising:
theoretical transfer time calculating means configured to calculate a theoretical transfer time of connections for which packets belong;
packet information holding means configured to hold information relating to the packets by each connection, before said theoretical transfer time calculating means calculates the theoretical transfer time of the connection for which the packets belong;
first holding means configured to divide the calculated information relating to said theoretical transfer time at a standardized time unit, and to hold the divided information by linking with the connection for which the packets belong;
second holding means configured to add a portion of said information held in said first holding means to information relating to a transfer order, and to hold the added information by linking with the connection for which the packets belong; and
extracting means configured to extract a packet of a same connection as the connection for which the packet transferred from said second holding means belongs, from said packet information holding means, and to transfer the extracted packet to said theoretical transfer time calculating means.

15. The shaping control apparatus according to claim 14,
wherein said packet information holding means transfers the information relating to the packet to said theoretical transfer time calculating means so that a plurality of packets belonging to the same connection do not exist in said first and second holding means.

16. The shaping control apparatus according to claim 14,
wherein said first holding means sets a plurality of time series different from each other based on categories of the connections including at least one of types of output ports, types of line qualities, and types of communication speeds, and divides into these time series the connections for which the packets belong.

17. The shaping control apparatus according to claim 16,
wherein said extracting means assigns priorities based on categories of the connections, and allows a portion of said information held in said first holding means to hold in said second holding means based on the assigned priorities.

18. The shaping control apparatus according to claim 14,
wherein said first holding means sets a plurality of time series having standardized times different from each other, and divides into these time series the connections for which the packets belong.

19. The shaping control apparatus according to claim 14,
wherein said extracting means manages said information held in said first holding means by a LIFO (Last In Fast Out) method.

* * * * *